United States Patent

[11] 3,573,529

| [72] | Inventor | Kaoru Tomii |
| | | Tokyo, Japan |
| [21] | Appl. No. | 833,254 |
| [22] | Filed | June 16, 1969 |
| [45] | Patented | Apr. 6, 1971 |
| [73] | Assignee | Matsushita Electric Industrial Co. Ltd. |
| | | Osaka, Japan |
| [32] | Priority | Oct. 2, 1968 |
| [33] | | Japan |
| [31] | | 43/72345 |

[54] FACEPLATE OF THIN-WINDOW RECORDING TUBE HAVING INTERMEDIATE SHEET OF SMALLER REFRACTIVE INDEX THAN THE FACE PLATE
3 Claims, 4 Drawing Figs.

[52] U.S. Cl. .................................................. 313/92, 313/110, 346/110
[51] Int. Cl. ....................................................H01j 29/18, H01j 5/16
[50] Field of Search.......................................... 313/92, 111, 112, 110, 64 (All), 92 (PF); 250/217; 346/110, (Hartway Group), 282; 350/162

[56] References Cited
UNITED STATES PATENTS

| 2,476,619 | 7/1949 | Nicoll............................ | 313/92 |
| 3,027,219 | 3/1962 | Bradley......................... | 346/110 |
| 3,141,106 | 7/1964 | Kapany......................... | 313/92 |

*Primary Examiner*—John Kominski
*Assistant Examiner*—V. Lafranchi
*Attorney*—Stevens, Davis, Miller and Mosher

ABSTRACT: An improved faceplate of a thin-window recording tube having an additional glass sheet interposed between the outermost glass sheet and fluorescent layer. The faceplate offers increased resolution due to minimized diffusion of the output luminescent light with the refractive index of the intermediate glass sheet smaller than that of the outermost glass sheet.

KAORU TOMII

INVENTOR

BY STEVENS, DAVIS, MILLER & MOSHER

ATTORNEYS

FACEPLATE OF THIN-WINDOW RECORDING TUBE HAVING INTERMEDIATE SHEET OF SMALLER REFRACTIVE INDEX THAN THE FACE PLATE

The invention relates generally to improvement in the faceplate of a thin-window recording tube and, more particularly, to improvement in the configuration of the faceplate of a thin-window recording tube, which faceplate features significantly lessened diffusion of the output luminescent light evolved from the fluorescent layer of the faceplate.

The faceplate of a thin-window recording tube as heretofore proposed is composed of a microsheet of glass (or mica is desired), a fluorescent layer of phosphor material applied through coating on the inner face of the glass sheet, and an aluminized backing attached to the inner face of the fluorescent layer.

The luminescence caused by the impingement of electron beams onto the layer of phosphor material is generally regarded as perfect diffused light and, hence, the radiation angle characteristics thereof can be expressed as follows: $I(\theta) = \alpha\cos\theta + (1-\alpha)\cos\theta[1-R(\theta)]$,
where $\alpha$: optical contact coefficient between the phosphor particles and glass sheet;

$\theta'$: angle of the radiation within the glass sheet.

It will be understood from the above equation that, in order to improve the resolution, it is important to have the glass sheet rendered as thin as possible. Such a reduction in the thickness of the glass sheet will, however, be reflected by critical decrease in the mechanical strength of the faceplate as a whole. For the purpose of improving the resolution without impairing the mechanical strength of the faceplate, it is advantageous to have the faceplate configured in such a manner that the diffusion of the luminescent light evolved from the phosphor particles is reduced to a minimum.

This is accomplished in the present invention through provision of an additional, intermediate layer of glass (or mica) sheet between the outermost glass sheet and the fluorescent layer, the intermediate layer having a smaller refractive index than the outermost glass sheet, as will be described in more detail.

Figure 1:
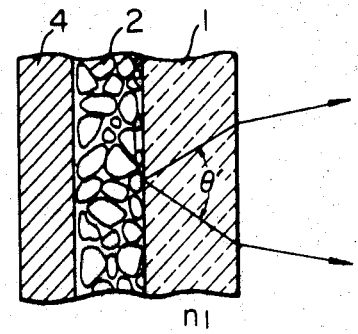
FIG. 1 shows the configuration of and radiation angle of the luminescent light in a faceplate of the prior art.

Now, referring to FIG. 1 which shows the configuration of the faceplate of a conventional type, the outermost glass sheet 1 is superposed direct on the fluorescent layer 2 of phosphor material so that the luminescent light emitted from the layer 2 radiates at a considerable angle $\theta'$ if the refractive index of the glass sheet is assumed to be $n_1$.

Figure 2:
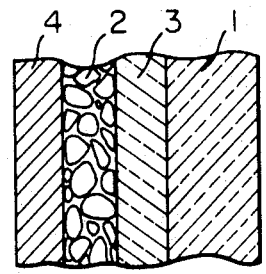
FIG. 2 shows the section of the faceplate configured according to the invention.

According to the invention, as illustrated in FIG. 2, there is interposed between the glass sheet 1 and fluorescent layer 2 an intermediate glass sheet 3 whose refractive index $n_2$ is smaller than that of the glass sheet 1, viz., $n_2 < n_1$.

Figure 3:
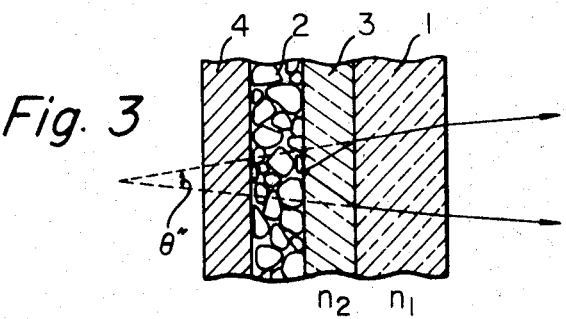
FIG. 3 is similar to fIG. 1 but shows the case of FIG. 2.

With the faceplate according to the invention thus constructed and arranged, the luminescent light emitted eventually from the outermost glass sheet 1 will advance in a direction as illustrated in FIG. 3. As seen from FIG. 3, the angle of radiation $\theta''$ of the luminescent light is significantly reduced with the refractive index $n_2$ smaller than the index $n_1$ of the glass sheet 1.

Designated at 4 is an aluminized backing which is usually attached internally to the fluorescent layer 2.

Figure 4:
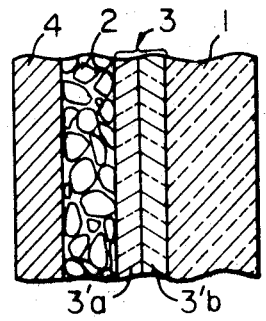
FIG. 4 shows a modification of the configuration of the faceplate of fIG. 2.

By preferance, the intermediate glass sheet 3 may be formed of two or more layers having refractive indices that decreases successively toward the outermost glass sheet 1. FIG. 4 shows an example of such configuration wherein the intermediate glass sheet 3' is shown to be composed of two layers 3'a and 3'b, the refractive index of the layer 3'a being smaller than that of the layer 3'b.

It will now be apparent from the foregoing description that the faceplate according to the invention is advantageous for reducing the diffusion of the luminescent light without affecting the mechanical strength of the faceplate in its entirety.

I claim:

1. A faceplate of thin-window recording tube, comprising an outermost glass sheet, an intermediate glass sheet adhered to the inner face of said outermost glass sheet, the refractive index of the latter being smaller than that of the former, a fluorescent layer of phosphor material disposed on the inner face of said intermediate glass sheet, and an aluminized backing adhered to the inner face of said fluorescent layer.

2. A faceplate according to claim 1, in which said intermediate glass sheet comprises a plurality of layers having refractive indices that decrease successively toward said outermost glass sheet.

3. A combination of a faceplate of thin-window recording tube comprising an outermost glass sheet, a fluorescent layer of phosphors and an aluminized backing adhered to said fluorescent layer, with an intermediate glass sheet which is interposed between said outermost glass sheet and fluorescent layer and which possesses a smaller refractive index than said outermost glass sheet.